(12) United States Patent
Leary et al.

(10) Patent No.: US 7,752,017 B1
(45) Date of Patent: Jul. 6, 2010

(54) SYSTEM AND METHOD FOR SIMULATING RESOURCE ALLOCATION

(75) Inventors: Daniel L. Leary, New Ipswich, NH (US); David W. Rolin, Carolina, RI (US); Dong Jiang, Medway, MA (US)

(73) Assignee: Moca Systems, Inc., Newton, MA (US)

( * ) Notice: Subject to any disclaimer, the term of this patent is extended or adjusted under 35 U.S.C. 154(b) by 344 days.

(21) Appl. No.: 11/389,489

(22) Filed: Mar. 24, 2006

Related U.S. Application Data

(60) Provisional application No. 60/664,973, filed on Mar. 24, 2005.

(51) Int. Cl.
*G06F 17/50* (2006.01)
*G06Q 10/00* (2006.01)

(52) U.S. Cl. .............................. 703/2; 703/6; 711/149; 705/7; 705/8

(58) Field of Classification Search .................. 703/22, 703/2, 5; 717/120, 151, 127; 705/7, 8; 711/149
See application file for complete search history.

(56) References Cited

U.S. PATENT DOCUMENTS

| | | | | |
|---|---|---|---|---|
| 4,972,314 | A * | 11/1990 | Getzinger et al. | ........... 711/149 |
| 5,255,181 | A | 10/1993 | Chapman et al. | |
| 5,295,065 | A * | 3/1994 | Chapman et al. | .............. 700/99 |
| 5,303,170 | A | 4/1994 | Valko | |
| 5,586,021 | A | 12/1996 | Fargher et al. | |
| 5,799,286 | A | 8/1998 | Morgan et al. | |
| 5,826,252 | A | 10/1998 | Wolters, Jr. et al. | |
| 6,789,054 | B1 * | 9/2004 | Makhlouf | ....................... 703/6 |
| 6,850,892 | B1 * | 2/2005 | Shaw | ............................ 705/8 |
| 7,054,936 | B2 * | 5/2006 | El Batt et al. | ............... 709/226 |
| 2002/0049621 | A1 * | 4/2002 | Bruce | ........................... 705/7 |
| 2003/0018803 | A1 * | 1/2003 | El Batt et al. | ............... 709/236 |
| 2003/0083912 | A1 * | 5/2003 | Covington et al. | ............. 705/7 |
| 2003/0139917 | A1 | 7/2003 | Hardwick et al. | |
| 2005/0021713 | A1 * | 1/2005 | Dugan et al. | ................ 709/223 |

OTHER PUBLICATIONS

Foresight Systems, Inc.; http://www.foresightsystems-mands.com (1 page); at least as early as Jan. 2005.
Ptolemy II; http://ptolemy.eecs.berkeley.edu/ptolemyII/main.htm (4 pages); at least as early as Jan. 2005.
Caci Products Company, Simulation & Modeling; http"//Caciasl.com (2 pages); at least as early as Jan. 2005.

* cited by examiner

*Primary Examiner*—Thai Phan
(74) *Attorney, Agent, or Firm*—Daly, Crowley, Mofford & Durkee, LLP

(57) ABSTRACT

A system and method for simulating resource allocation, where the allocation strategies which can be simulated include those of prior art but also include a large class of important allocation strategies that are not possible or not easy to simulate using prior art techniques and systems is described. A location limiting allocation strategy is also described. This strategy supports resource capacity schedules and request priorities as supported by prior art, but simultaneously supports the enforcement of allocation limits applied to a property expressed in the allocation request, namely the location of the work to be performed, or a location, resource pair to perform the work.

21 Claims, 10 Drawing Sheets

| Parameter | Value | | | |
|---|---|---|---|---|
| Resources | Resource | Requested | Allocated | |
| | Plumbers | 2 | 0 | |
| | Carpenters | 1 | 0 | |
| Priority | 10 | | | |
| Queue ID | Queue X | | | |
| Location | Room A | | | |

*FIG. 9*

SYSTEM AND METHOD FOR SIMULATING RESOURCE ALLOCATION

CROSS-REFERENCE TO RELATED APPLICATIONS

This invention claims the benefit under 35 U.S.C. s.119(e) of provisional application No. 60/664,973 filed Mar. 24, 2005 which application is hereby incorporated herein by reference in its entirety.

STATEMENTS REGARDING FEDERALLY SPONSORED RESEARCH

Not applicable.

FIELD OF THE INVENTION

This invention is generally related to simulations and more particularly related to simulations of real world scenarios.

BACKGROUND OF THE INVENTION

As is known in the art, a "simulation model" or more simply a "model" is a specialized software program used to simulate a real world scenario. A large class of simulation models simulate scenarios which are comprised of individual tasks the antecedent conditions for which involve the allocation of one or more resources which may be used or needed by multiple tasks. The resources are thus sometimes referred to as "common resources."

For example, a simulation of the construction of a building might consider carpenters and plumbers to be resources. The simulation might be constructed so that many individual carpentry and plumbing tasks that are involved in constructing the building are each associated with an allocation request. Each request would describe a number of carpenters or plumbers needed to perform the associated task. The simulation proceeds only when available resources are allocated to a request, allowing the task associated with the request to be performed. Since the outstanding requests all potentially compete for some common set of available resources, there is often resource contention among the requests.

In such simulation models, the means by which resource allocation requests are submitted and selectively granted to the requesting tasks is often referred to as the "resource allocation strategy" for the simulation. Resource allocation also occurs in simulations of processes such as manufacturing processes, where manufacturing tools and materials might be construed as resources.

Many simulation models contain mechanisms for simulating resource allocation. These mechanisms may be provided by the simulation modeling system in which the model is constructed, or they may be constructed as part of the simulation model itself, perhaps making use of an extensibility mechanism provided by the simulation modeling system. It is also possible to construct a resource allocation mechanism using generic, non-simulation specific programming techniques, as might be done when a simulation model is built directly using an ordinary programming language.

The SimProcess and SimScript and the Foresight simulation modeling systems, for example, have resource allocation mechanisms built in, which can be invoked when constructing a simulation model. These systems as well as the Ptolemyll system also have extensibility mechanisms which allow the simulation modeler to provide additional logic in conjunction with the simulation model itself in order to implement resource allocation mechanisms.

Whether implemented directly or by extension, in this prior art, it is typically possible to name sets of resources, describe those resource capacities, and to provide schedules which describe how a resource capacity may change over time. It may also be possible to replenish a resource, increasing its capacity during the course of simulation. Another common prior art characteristic is the ability to associate a priority value with each individual resource allocation request. In the presence of competing outstanding requests, the allocation strategy then allocates requests in order of descending priority. Using only resource capacities and request priorities as provided in the prior art, however, it is difficult, impractical or sometimes even impossible to simulate a large class of resource allocation strategies. In particular, allocation strategies which make reference to one or more attributes other than resource levels or priorities of the task for which the allocation is required, can be extremely difficult or impossible to simulate.

Consider again a building construction simulation. It may be the case that the building contains a location, say Room A, which is physically too small to accommodate more than 3 workers of any type at any time. Therefore, the resource allocation strategy should only allocate resources to Room A if it doing so does not exceed the 3 worker limit. Given only the task attribute of priority supported by the prior art, this constraint is difficult to enforce in a simulation. An attempt to do so using just task priority would seem to entail that the priority be modified dynamically during the course of the simulation, while the request was still pending and unallocated. When Room A was full of workers, for instance, the priorities of remaining requests would have to be adjusted so that all requests in locations other than Room A would have greater priority than all outstanding Room A requests. But when some task completes in Room A, making it possible to allocate some more resource to Room A, some outstanding Room A request would have to have its priority adjusted again so that Room A could receive another allocation without having to wait for all the work in other rooms to complete first. So task priority alone is incapable of expressing the limit of resources which can be allocated to a specific location.

A similar allocation problem arises when there is a pool of resources available, say five (5) plumbers, but the simulation calls for the plumbers to behave as if they were two core crews of two (2) plumbers each, with 1 floating plumber who can participate in either crew at any time. The prospect of dynamically changing request priorities and possibly altering resource capacities dynamically is equally intractable in this case.

SUMMARY OF THE INVENTION

In accordance with the present invention, it has been recognized that both of the above examples are easily expressed in and implemented by the techniques and systems described herein. Furthermore, the techniques and systems described herein allow many other complex allocation strategies to be simulated, which strategies need to make reference to some attribute of the task other than a required resource level or a task priority. The present invention is directed toward a system and method for simulating resource allocation, where the allocation strategies which can be simulated include those of prior art but also include a large class of important allocation strategies that are not possible or not easy to simulate using prior art. Also described is a particular type of allocation strategy referred to as a location limiting allocation strategy.

This strategy supports resource capacity schedules and request priorities as supported by prior art systems, but simultaneously supports the enforcement of allocation limits applied to a property expressed in the allocation request, namely the location of the work to be performed, and/or a location-resource pair of needed to perform the work. The invention is, furthermore, extensible, which makes it amenable to being used to implement additional allocation strategies above and beyond the location limiting strategy presented.

The system and techniques described herein solve, at least in part, problems of simulating resource allocation in those cases which are more complex than can be expressed by resource schedules and request priorities alone and/or the problem of simulating resource allocation where one or more properties of the simulated task (other than its priority or resource requirements) enters into the allocation algorithm. Stated differently, the system and techniques described herein provide a straightforward way to express resource allocation with more sophistication than resource schedules and priorities.

Two important features of the system and techniques described herein are the structure of the resource allocation request and the allocation strategy.

The structure of the request (the range of things that can possibly be expressed) must be coordinated with the means that decides when a request is allocated. The means can be implemented in either hardware, software (e.g. a section of code) or a combination thereof. If it is desired to allocate based on location, for instance, then the allocation request has to somehow mention location (or location must somehow be derivable). Thus, in one aspect, the present invention is directed toward a technique in which a request structure is coordinated with an allocation process such that factors which may enter into the allocation calculation are present in (or derivable from) the allocation request structure.

In one implementation of an allocation strategy, an interface allows a single allocate next request operation to encapsulate all the nuances of the allocation strategy itself. This assumes, of course, that appropriate surrounding infrastructure, such as the requestor and manager as described herein, is provided. Having initialize and free operations makes the allocate next request operation cleaner and simpler, but, as pointed out herein, they are technically implementable by other means. Thus, in another aspect, the present invention is directed toward a technique wherein requests are submitted and an allocation algorithm allocates a next request if possible from among all pending requests.

In yet another aspect, the present invention is directed toward any simulation systems and extensible mechanisms which produce/provide the same net effect as the system described herein, regardless of whether it was (a) done in the simulation model itself as an extension to the simulation system, (b) done in the simulation system itself for use by the simulation model, or (c) done without a simulation system for all, from scratch, as it were.

In yet a further aspect, the present invention is directed toward a Location Limit Strategy which is extensible and which is adapted to cooperate with surrounding infrastructure.

It should be appreciated that the requestor and manager described herein could be combined or separated apart in various ways and still have the same net effect as that described herein.

BRIEF DESCRIPTION OF THE DRAWINGS

The foregoing features of this invention, as well as the invention itself, may be more fully understood from the following description of the drawings in which:

FIG. 9 is a block diagram of a request structure;

DETAILED DESCRIPTION OF THE INVENTION

Figure 1:
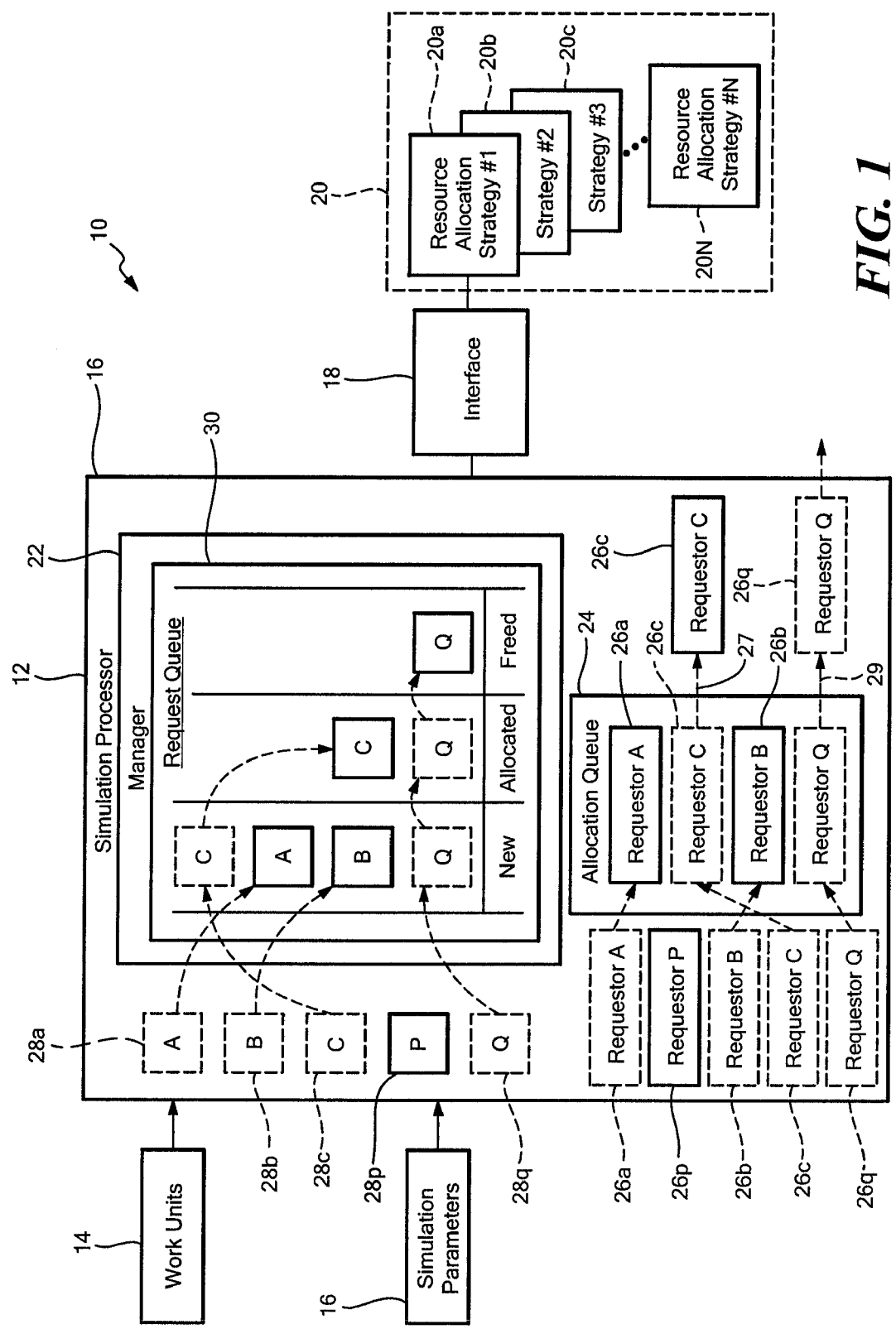
FIG. 1 is a block diagram of a simulation system which includes a resource allocation strategy module.

Before describing processing and systems for performing resource allocation, it should be appreciated that, in an effort to promote clarity, reference is sometimes specifically made herein to allocation of resources in a construction project. And in particular, reference is sometimes made herein to allocation of specific resources (e.g. carpenters and plumbers) with respect to certain tasks related to the construction of building.

It should be understood that such references should not be taken as limiting the techniques and systems described herein as being for use only with construction projects or with particular types of resources. Rather, the techniques and systems described herein may be used in any application requiring allocation of resources of any type. Thus, it should be appreciated that the techniques and systems described herein find application in a wide variety of different applications including but not limited to simulations of processes such as manufacturing processes, where manufacturing tools and materials might be construed as resources; construction of communications and power networks; chemical supply and manufacturing operations; supply chain operations, construction of aircraft (including but not limited to airplanes and helicopters) and construction of motorized vehicles such as cars and boats.

Accordingly, those of ordinary skill in the art will appreciate that the description and processing described herein as taking place on carpenters, plumbers, rooms, and tools could equally be taking place on manufacturing tools, materials or any other resource. Likewise, in place of or in addition to utilizing an allocation strategy such as the location limiting strategy described herein, an allocation strategy may be implemented which reflects the fact that only a certain number of people (e.g. engineers or manufacturing personnel) can operate or utilize a particular machine at the same time during a manufacturing operation.

Described herein are systems and methods for simulating resource allocation, where the allocation strategies which can be simulated include both conventional allocation strategies as well as a large class of important allocation strategies that are not possible or not easy to simulate using prior art techniques or systems. In order to promote conciseness and clarity in the description of the concepts to be claimed, one exemplary allocation strategy referred to as a "location limiting allocation strategy" is also described herein.

The location limiting allocation strategy supports resource capacity schedules (e.g. lists of how many of a particular type of resource are available in a given day or over any period of time as known by a resource manager) and request priorities as supported by prior art systems and techniques, but simultaneously supports the enforcement of allocation limits applied to a property expressed in the allocation request, namely the location of the work to be performed, or a location, resource pair needed to perform the work. The techniques and system are, furthermore, extensible, which makes it amenable to being used to implement additional allocation strategies above and beyond the location limiting strategy presented. This is accomplished by providing resource allocation strategy modules which are encapsulated (i.e. the data and functions are self contained within the strategy module) and which all cooperate with the same interface (i.e. each module mates with the same interface). In this way, a user (e.g. a code developer), can generate resource allocation strategy modules which perform user-defined functions (with each resource allocation strategy capable of implementing a different function) and yet which are all compatible with the same interface and thus the same simulation processor.

It should also be appreciated that although reference is sometimes made herein to the exemplary techniques and systems as described herein being implemented with "object-oriented" computer programming techniques, other implementation techniques may also be used. Object-oriented computer programming techniques involve the definition, creation, use and destruction of software entities referred to as "objects." Each object is an independent software entity comprised of data called "attributes" and software routines called "member functions" or "methods" which manipulate the data.

One characteristic of an object is than only methods of that object can change the data contained in the object. The term "encapsulation" describes the concept of packaging the data and methods together in an object. Objects are thus said to encapsulate the data included as part of the object. Encapsulation protects an object's data from arbitrary and unintended use by other objects and therefore prevents an object's data from corruption.

To write an object-oriented computer program, a computer programmer designs and writes computer code for a set of "classes." Each of these classes serves as a template that defines a data structure for holding the attributes and program instructions which perform the method of an object. Each class also includes a means for creating an object from the class template. The means for creating a method referred to as a "constructor."

When a processor of a computer executes an object oriented computer program, the processor creates objects from the class information using the constructor methods. Thus, a collection of objects which are constructed from one or more classes form the executing computer program.

Object oriented computer programming techniques allow computer programs to be constructed of objects that have a specified behavior. Several different objects can be combined in a particular manner to construct a computer program which performs a particular function or provides a particular result. Each of the objects can be built out of other objects that in turn can be built out of other objects. This resembles complex machinery being built out of assemblies, subassemblies and so on.

For example, a circuit designer would not design and fabricate a video cassette recorder (VCR) transistor by transistor. Rather, the circuit designer would use circuit components such as amplifiers and the like each of which may contain hundreds or thousands of transistors. Each circuit component could be considered an object which performs a specific operation. Each circuit component has specific structural and functional characteristics and communicates with other circuit components in a particular manner. The circuit designer uses a bill of materials which lists each of the different types of circuit components which must be assembled to provide the VCR. Similarly, computer programs can be assembled from different types of objects each have specific structural and functional characteristics.

In one exemplary embodiment, a particular set of classes have been developed which, during program runtime, generate a particular set of objects to simulate allocation of resources needed in a particular job or function.

However, although the concept of objects and encapsulation described herein can be implemented using object-oriented computer programming techniques, other implementation techniques (i.e. non-object oriented techniques) may also be used.

Referring now to FIG. 1, a simulation system 10 includes a simulation processor 12 adapted to receive one or a collection of work units 14 to be simulated and a plurality of user-selectable simulation parameters 16. Among the simulation parameters 16 may be found a parameter indicating that a specific choice of allocation strategies is to be used. For example, one of the simulation parameters might identify a location limit strategy for use in a particular simulation. Alternatively, the parameters might specify use of a strategy which handles non-deterministic behaviors or perturbations (e.g. materials not arriving on time, weather, injury to workers, natural disasters, re-work issues (e.g. to account for quality in materials or labor). Alternatively still, a strategy which accounts for the effectiveness of a particular resource may be used. For example, considering plumbers as a resource in a construction project, a resource manager may notice that one particular plumber works faster that the other plumbers (e.g. by observing resource allocation patterns using past history). Such an effectiveness strategy may be used in conjunction with or in place of the basic and location limit allocation strategies. Simulation parameters may also include other parameters governing simulation behavior that are not work unit specific. The work units 12 and simulation parameters 14 are provided to a simulation model 16 and serve as runtime inputs to the simulation model 16.

The simulation processor 16 communicates through an interface with one or more selected ones of a plurality of allocation strategies generally denoted 20. In this exemplary embodiment N different allocation strategies 20a-20N are available to be used. Those of ordinary skill in the art should appreciate that any number of allocation strategies (e.g. only one strategy) may be used or even available in a particular application. The communication between the simulation model 16 and the one or more allocation strategies 20 may be in both read and write fashion, passing data by reference or by value or a combination thereof. The interface 18 encapsulates this communication. An instance of a first allocation strategy 20a that implements the interface 18 is shown coupled to interface 18.

When executing a simulation, the simulation processor includes a manager 22 and an allocate queue 24. Requestors 26a, 26b, 26c, 26p, 26q from one or more of the work units 14 submit requests 28a, 28b, 28c, 28p, 28q to the manager 22. In a preferred embodiment, there is one manager in a given execution of a simulation model. It is also possible to use multiple managers, for instance, if multiple allocation strategies are simultaneously employed in a simulation. In other embodiments, each requestor could also include manager logic and thus perform some or all of the manager function.

It should be appreciated that, for ease and clarity of description, FIG. 1 illustrates one exemplary state of the simulation processor 12 at a one specific instance of simulated time. When the manager 22 receives the request, the request is eventually received in a request queue 30 as a new request. For example, as indicated by the dashed lines Requests A, B, C and Q 28a. 28b, 28c, 28q, respectively, are first moved into a resource queue 30 as new requests. Requests C and Q 28c, 28q are subsequently acted upon and are indicated as being allocated requests 28c, 28q. Request 28q is shown in phantom as an allocated request since it is further acted upon and is indicated as being freed. Thus, Requests C and Q 28c, 28q are both shown in the "allocated" portion of the Request queue 30.

Correspondingly, before requests A and B 28a, 28b are received as new requests in the request queue 30, requestors A and B designated as 26a, 26b are outside the allocation queue 24. Requestors 26a, 26b outside the allocation queue 24 are shown in phantom since once the requests A, B 28a, 28b are received as new requests in the request queue 30, the requestors A and B 26a, 26b are moved into the allocation queue 24. Requestor P 28p, on the other hand, is not shown in phantom outside the allocation queue 24 since request P, 28p has not yet been received into the request queue 30.

Once request C 28c is allocated, requestor 26c is moved out of the allocation queue as indicated by reference arrow 27. Likewise, once request Q 28q is allocated, requestor 28q is moved out of the allocation queue as indicated by reference arrow 29. Request Q 28q is subsequently freed and thus requestor Q 26q also becomes freed. Thus, the manager 22 releases each of the requestors 26a-26q as appropriate, from the respective allocation queue 24

It should be appreciated that the position of requestors within the allocation queue 24 does not indicate ordering (i.e. the system is not a first-in-first-out system, although it is possible that requests can end up being processed in that order). Rather, the manager decides the order in which to fill the requests based upon the allocation strategy being used for the particular simulation. It should also be appreciated that a discrete event scheduler is assumed to be operating in the context of the simulation the event scheduler schedules allocation call requests at the appropriate simulation time. It should further be appreciated that a requestor may submit more than one request at any time. That is, one requestor can have multiple requests in a single state (i.e. new, allocated, etc. . . . ) at any point in time.

The manager decides the manner in which to fill each request. It should be appreciated that ordering is but one manner (of many possible manners) a manager may use to fill requests. For example, the manager is not limited to simply ordering (or re-ordering) request. Rather, the manager may partially fill a request or may modify some portion of a request or even an entire request to based upon an allocation strategy.

It should be appreciated that for clarity and ease of description in both FIG. 1 itself and the corresponding text, only one allocation queue 24, several requestors 26, several requests 28 and one request queue 30 is shown. In a practical system (e.g. during an actual simulation), it should be understood that many requests (possibly thousands of requests at any one point in time), many requestors and multiple request queues and allocation queues would exist and that requestors could flow from one allocation queue to another as appropriate for any given resource allocation strategy.

FIGS. 2-7 are a series of flow diagram illustrating the processing performed by a processing apparatus which may, for example, be provided as part of a simulation system such as that described above in conjunction with FIGS. 1 and 2. The rectangular elements (e.g. block 202 in FIG. 2) in the flow diagram(s) are herein denoted "processing blocks" and represent steps or instructions or groups of instructions. Some of the processing blocks can represent an empirical procedure or a database while others can represent computer software instructions or groups of instructions. The diamond shaped elements in the flow diagrams (e.g. block 207 in FIG. 2) are herein denoted "decision blocks" and represent steps or instructions or groups of instructions which affect the processing of the processing blocks. Thus, it should be appreciated that some of the processing described in the flow diagrams may be implemented via computer software while others may be implemented in a different manner e.g. via an empirical procedure. Alternatively, some of the processing blocks can represent steps performed by functionally equivalent circuits such as a digital signal processor circuit or an application specific integrated circuit (ASIC).

It should also be appreciated that the flow diagrams do not depict the syntax of any particular programming language. Rather, the flow diagrams illustrates the functional information one of ordinary skill in the art requires to perform the processing or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figure 2:
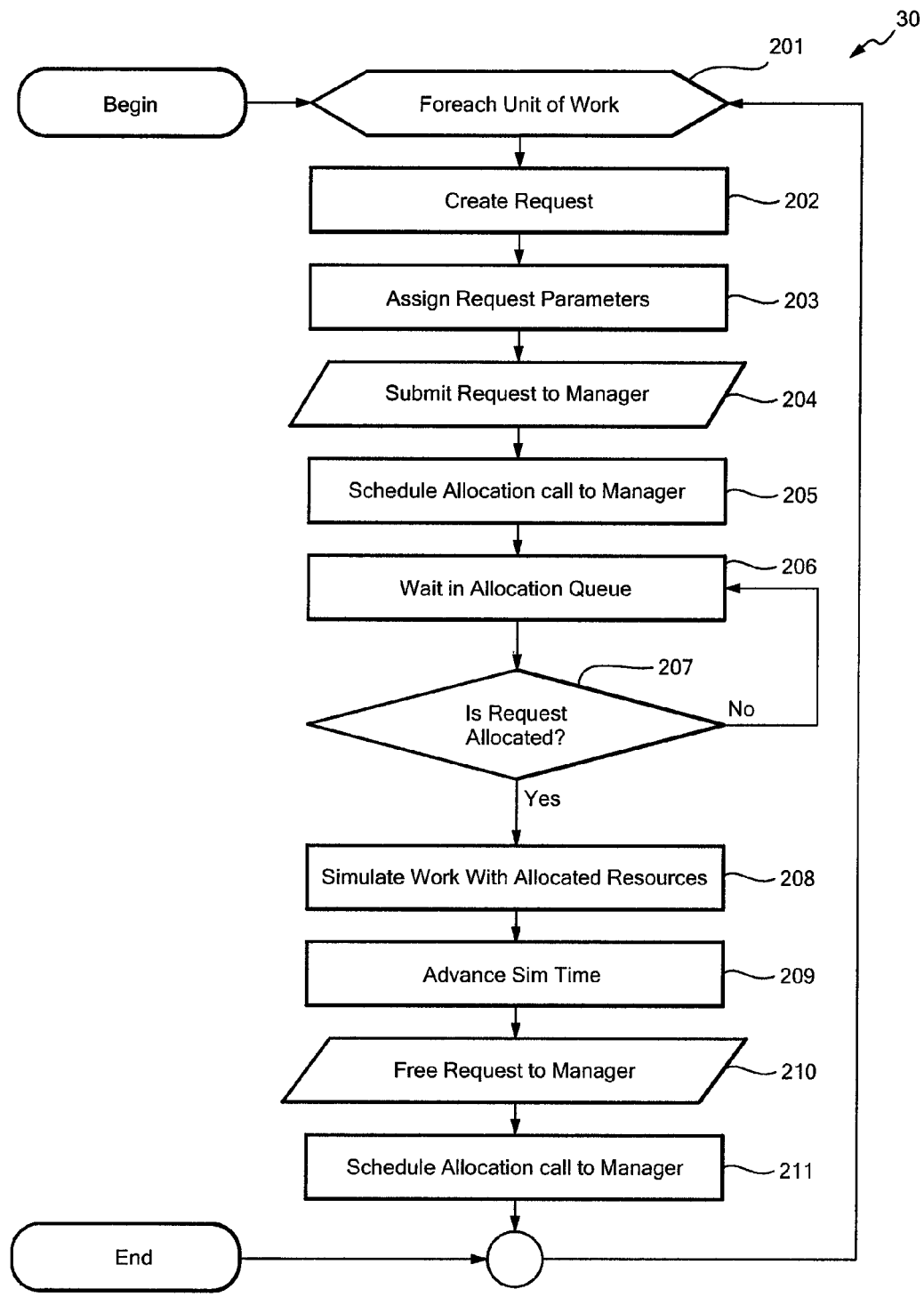
FIG. 2 is a flow diagram which illustrates requestor flow.

Turning now to FIG. 2, in a preferred embodiment, processing begins with one or more requestor threads of execution issuing resource allocation requests with respect to a sequence of one or more units of work to be simulated.

Block 201 represents a loop over a sequence of work units to be simulated. For each such work unit, the requestor creates a new request as shown in processing block 202 and assigns values to the various parameters of the request as shown in block 203. One exemplary assignment of request parameters is depicted in FIG. 9. Request parameters are also discussed below. The request parameters determine the specific nature of this particular request, such as which type of resources are requested, how many of each, the priority of the request, the location of the work to be performed, et cetera. In a preferred embodiment, an identifier of an allocation queue, to be entered in step is included among the request parameters.

In processing block 204, the requestor submits the request to the manager thread, described below in conjunction with FIG. 3. In a preferred embodiment, there is exactly one manager thread of execution (or more simply a "manager thread" or "manager") in a given execution of a simulation model, and it is a different thread from each requestor. In equivalent embodiments, however, manager and requestor threads may be more or less numerous (e.g. one or a plurality of threads may be used). The manager receives each such submit request call in processing block of FIG. 3.

In processing block 205, an allocate requests call to a manager is scheduled. In the preferred embodiment, a discrete event scheduler is assumed to be operating in the context of the simulation, and processing block 205 schedules an allocation request call at the simulation time which is one (1) discrete event clock tick later than the simulation time at which the processing of processing block 204 was most recently performed. If such a call is already scheduled at that time, then processing block 205 becomes a no-op. Since there may be many concurrent requestor threads in the preferred embodiment, this assures that after all requests have been submitted at the current simulated time, the manager thread will in the next tick attempt to allocate one or more of the outstanding requests.

In alternative embodiments, the manager might be self-scheduled to attempt allocate requests calls at regular intervals. Another alternative embodiment would have the receipt of each submit request call initiate an allocate requests call immediately thereafter. Such alternative embodiments may alter the pattern of allocation strategy requests which occur over a period of time.

In processing block 206, the requestor thread enters an allocation queue, and waits until it is released from the queue. When it is released, in processing block 207, the requestor thread examines the request it had made earlier to determine if resources in the request were actually allocated. The reason to do this is that in some embodiments there may be many requestors waiting in the same queue, and the release of the entire queue may occur even though not all queued requestors' requests have been allocated. Some embodiments may allow requests to be partly allocated rather than completely allocated. In this case, the requestor may examine the request to determine if sufficient resources have been allocated in order for the simulated work to be performed. If not, then the requestor returns to processing block 206 and places itself back in the queue to wait for additional allocation.

If instead the requestor determines that the requested resources have been allocated sufficiently, then processing proceeds to processing block 208 and simulates the unit of work, using those resources which have been allocated. Among the side effects of simulating the unit of work is processing block 209, which arranges that simulation time advance. In the preferred embodiment, the advance of simulation time is accomplished by asking the discrete event scheduler to schedule the departure of the requestor from processing block 209 at some scheduled time in the simulated future. Other embodiments may arrange for simulated time to advance by other means.

At processing block 210, when simulated time has advanced enough to represent the passage of time entailed by the unit of work given the allocated resources, the requestor makes a so-called free request call to the manager, signaling that the allocated resources of this request are now freed from this allocation. This makes the resources available to be allocated again to another outstanding request. The manager receives each such notification (e.g. Free Request call) in processing block 303 of FIG. 3.

In other embodiments, a request might be freed automatically at the end of some simulated time period, or coincident with the occurrence of some other event, or it might be scheduled to be freed after some amount of simulated time to be indicated among the request parameters. In any event, it must be possible for the allocation strategy to determine when an allocated resource is no longer required by the task to which it has been allocated, and the resource thereby becomes available to other allocations.

If the requestor has additional units of work to simulate, execution returns to the head of the loop at processing block 201. Otherwise the requestor thread of execution ends.

Figure 3:
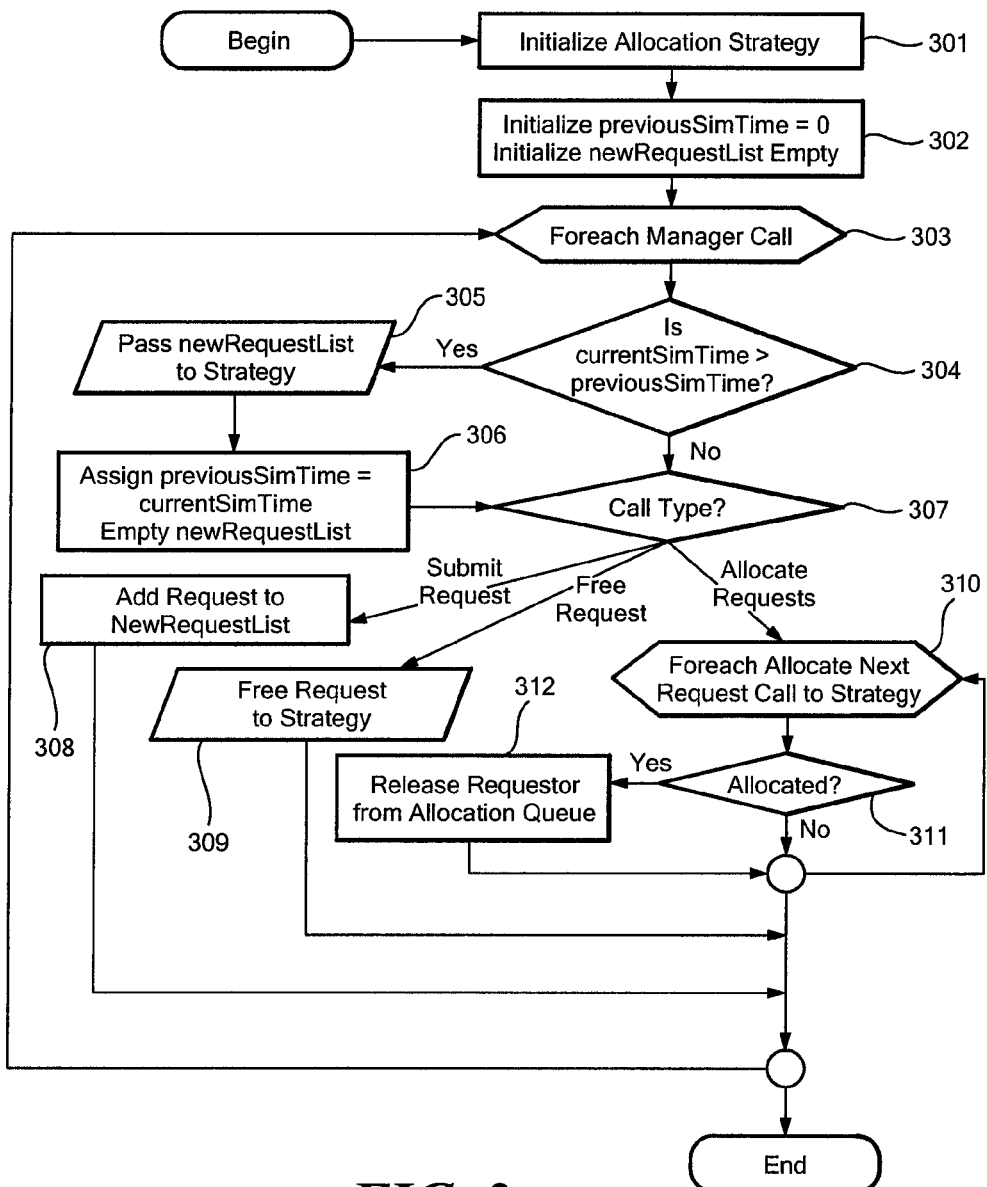
FIG. 3 is a flow diagram which illustrates a manager flow of control.

Referring now to FIG. 3, in processing block 301, the manager initializes the allocation strategy which has been chosen for the present execution of the simulation model (e.g. via submission of the simulation parameters 14 described above in conjunction with FIG. 1). The choice of an allocation strategy from among a range of strategies, and the parameterization of an allocation strategy are among the aspects of the present system and technique which support extensibility. That is to say, in the preferred embodiment, the manager respects an interface (i.e. the manager implements the interface between the allocation strategies and the simulation processor) with the allocation strategy in which the manager calls the allocation strategy to initialize, to receive requests, to allocate a next request, and to free a request. Embodiments of these three interface calls are depicted in FIGS. 4-7, respectively. Invocations of each are performed by the manager in processing blocks 60, 80, 70, and 76, respectively, of FIG. 3.

There are variants of this interface between the manager and the allocation strategy which might be implemented in other equivalent embodiments. For example, rather than having separate initialize and receive requests calls, initialization of the allocation strategy might be assumed to occur upon first invocation of the receive requests call.

In the preferred embodiment, object oriented techniques are used to provide a hierarchy of concrete implementations of the allocation strategy interface. The simulation modeler (i.e. the person building the simulation model) or the user of the simulation model can choose one such implementation to be used for any particular execution of the simulation model, thereby simulating with a different allocation strategy in each case. The implementation of the manager described in FIG. 3 is the same in each case.

In processing block 302, the manager performs its own initialization, which amounts to initializing a previous simulation time variable (e.g. a SimTime variable) and a new request list variable (e.g. a RequestList variable). The former is to bear values of simulated time, as passed in from the requestor submit request or free request calls, or from the allocate requests call scheduled by some requestor. This variable is initialized in processing block 302 to have a value not greater than any the simulated time of any event to follow in the simulation, assumed here to be zero. The value of simulated time is assumed to never decrease between consecutive calls to the manager in the preferred embodiment. The latter variable holds a collection of requests, as submitted by requestors by means of the Submit Request call. This list is initialized in processing block 302 to be empty.

In processing block 303, the manager loops over the sequence of calls made by or scheduled to be made by requestors. For each such call, at processing block 304, the manager examines the simulated time passed in with the call to determine by comparison to its own local previous SimTime value, if simulated time has progressed. By assumption, simulated time does not regress, so the only other option is that simulated time has not changed. In a simulation scheduled by discrete events, the manager may receive more than one call at the same simulated time. If simulated time has progressed, then processing flows to processing block 305 in which all requests currently on the new request list are passed to the allocation strategy by means of the receive requests call. Then, at processing block 306, previous SimTime is updated with the latest value of simulated time, and the new request list (e.g. the new RequestList list) is emptied. If the call to the manager is discriminated at decision block 307 to be a Submit Request call, then the submitted request is added to the new request collection.

This mechanism insures that the allocation strategy is only made aware of newly submitted requests when all such requests for a given value of simulated time have been submitted by requestors. In an alternate embodiment, the manager could call the allocation strategy to receive requests when the simulation event scheduler determined that no other events remained at the present simulated time, and an advance of the scheduler clock was known by other means to be imminent. The intent of the preferred embodiment is that the allocation strategy be able to exercise its strategy with respect to all currently outstanding requests, at any given simulated time. The preferred embodiment therefore prevents the allocation strategy from being called when it has received some but not all of the requests submitted at any given simulated time.

If at decision block 307, the present call is discriminated to be a free request call, then the freed request is simply forwarded to the allocation strategy at processing block 209.

If at decision block 307, the call is discriminated to be an allocate requests call, then at processing block 310 the manager enters a loop in which the allocation strategy is invoked on each request to allocate a resource (e.g. each Allocate A Next Request) is repeatedly called on the allocation strategy until the allocation strategy determines that no more outstanding requests can be allocated. If, at decision block 311, a request is allocated by the strategy to the manager, then at processing block 312 the manager examines the request to find the identifier of the allocation queue at which the requestor that submitted the request is waiting, and releases the requestor from that queue. The loop implemented by decision block 310 iterates in this fashion until the allocation strategy can allocate no more requests. The manager then iterates the main call loop, returning control to processing block 303.

As mentioned above, the present invention includes extensibility characteristics which allow novel allocation strategies to be used for the execution of a simulation model. This extensibility is supported by the encapsulation of the requestor and manager logic from that of the allocation strategy.

In one exemplary embodiment, a concrete implementation of an allocation strategy interface and associated data structures is provided by a class called a basic priority strategy class. This class is then extended by a subclass, called the location limiting strategy, to provide all the functionality of the basic priority strategy class, and in addition, functionality to allow the simulation user or modeler to associate resource allocation limits with attributes of the allocation request. The location limiting strategy will obey such limits as provided by the user, not allocating resources on behalf of requests which would violate any declared limits.

In the preferred embodiment, four operations (or object oriented methods) of the allocation strategy interface are implemented by the basic priority strategy, and all but one of these operations is extended by the location limiting strategy. The four operations are depicted in FIGS. 4-7. The decision blocks at steps 404, 604, 606, 610, and 704 illustrate where the basic priority strategy is extended by the location limiting strategy. An affirmative branch on any of these decision blocks indicates that the location limiting strategy extensions are in effect, and a negative branch indicates that only the basic priority strategy semantics are to be applied, as chosen by the simulation modeler or user at simulation runtime.

Figure 8:
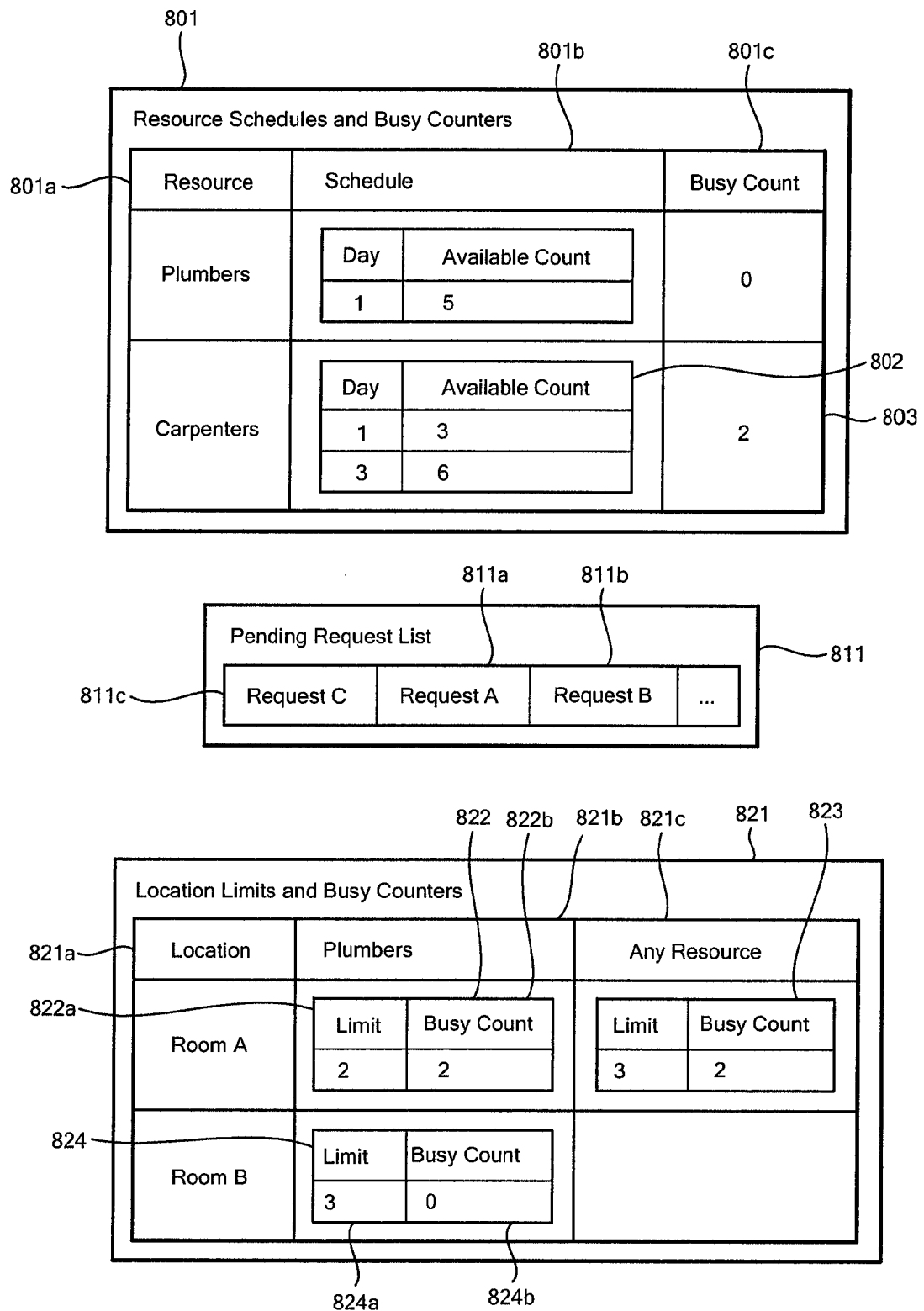
FIG. 8 is a block diagram of exemplary data structures maintained by an allocation strategy.

In conjunction with these four operations, the Basic Priority Strategy also implements two data structures (or sets of object oriented variables born by object instances), both of which are then extended by the location limiting strategy in the preferred embodiment. Instances of these data structures are depicted in FIGS. 8 and 9.

Figure 4:
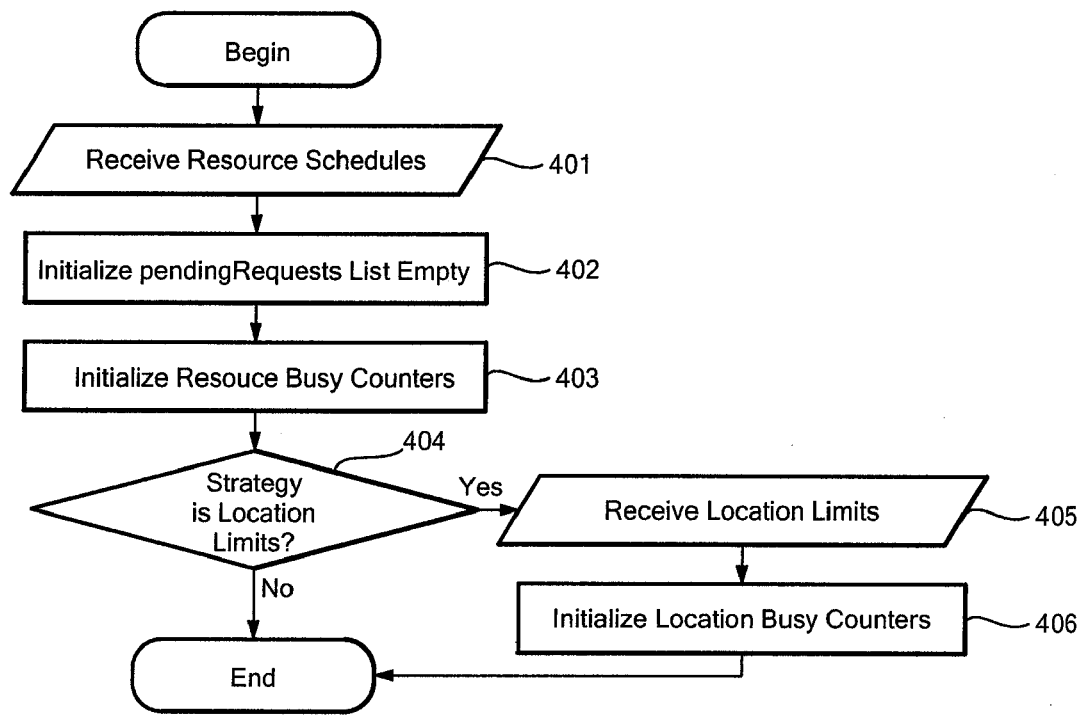
FIG. 4 is a flow diagram which illustrates an allocation initialization operation.

As described above, the manager calls the allocation strategy in processing block 301 of FIG. 3 to initialize itself, and this initialization operation is depicted in FIG. 4. During initialization, the allocation strategy constructs and assigns initial values to a context data structure, an example of which is depicted in FIG. 8.

In processing block 401, the allocation strategy receives the resource allocation schedules in preparation for beginning the simulation. These schedules name the types of resources which are available and how many are available at what times during the course of the simulation. In processing block 402, a list structure is created, initially empty, which will contain pending requests. In processing block 403, a counter is initialized for each resource type described in the resource schedules, to indicate that there are initially zero elements of each resource type currently allocated to a request, i.e. busy.

If the allocation strategy being used for the simulation is a location limit strategy, then at decision block 404 initialization branches to processing block 405, which receives a description of the limits to be enforced for this simulation from the user or the modeler. At processing block 406, these limits are initialized to indicate that there are no resources initially busy in any location.

In processing block 305 of FIG. 3, the manager invokes the allocation strategy to make it aware of new requests which are henceforth to be considered as pending and subject to possible allocation. The allocation strategy implementation of this procedure is depicted in FIG. 5.

Figure 5:
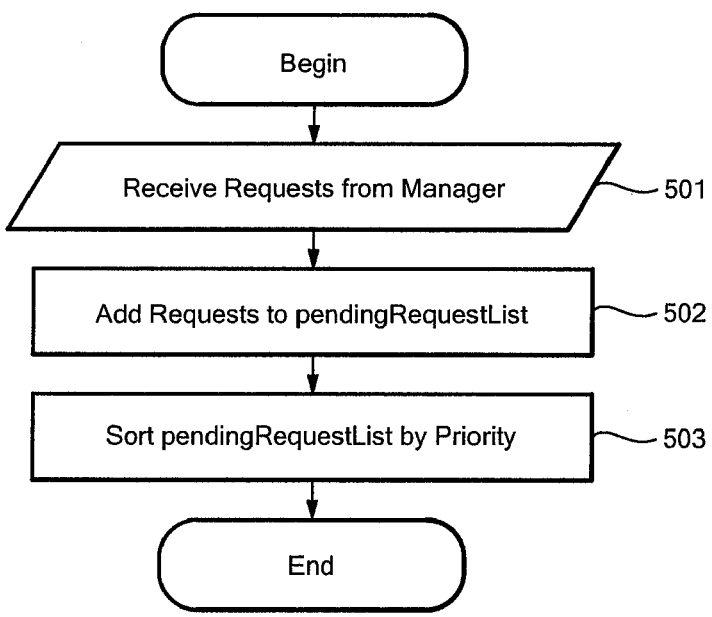
FIG. 5 is a flow diagram which illustrates an exemplary procedure for handling requests received by an allocation strategy.

Referring now to FIG. 5, processing begins in processing block 501 in which the allocation strategy receives the requests from the manager It should be noted that these requests correspond to requests which the manager had each received originally from the requestor at processing block 204 of FIG. 2. One such request which might be received by the allocation strategy is depicted in FIG. 9.

Processing block 502 adds each received request to the list of pending requests, and then at processing block 503, the list is sorted so that requests of higher priority appear earlier on the list. In a preferred embodiment, this sort process further sub-sorts requests of the same priority, if any, so that requests made earlier in simulated time appear on the pending request list before requests of the same priority but which were submitted at later simulation times. After reading the description herein, it should be apparent to one of ordinary skill in the art, that the further details of the sorting operation might be parameterized and assigned by the simulation user or by other means in alternative embodiments.

One possible state of the sorted pending request list is depicted as item 811 in FIG. 8 where Request C 811c is sorted before Request A 811a, which in turn has been sorted before Request B 811b. Hence the priority assigned to Request C 811c is not less than that of Request A 811a, and Request A priority is not less than Request B priority.

In processing block 310 of FIG. 3, the manager invokes the allocation strategy to allocate a next request from among those pending. The allocation strategy's implementation of this operation is depicted in FIG. 6.

Figure 6:
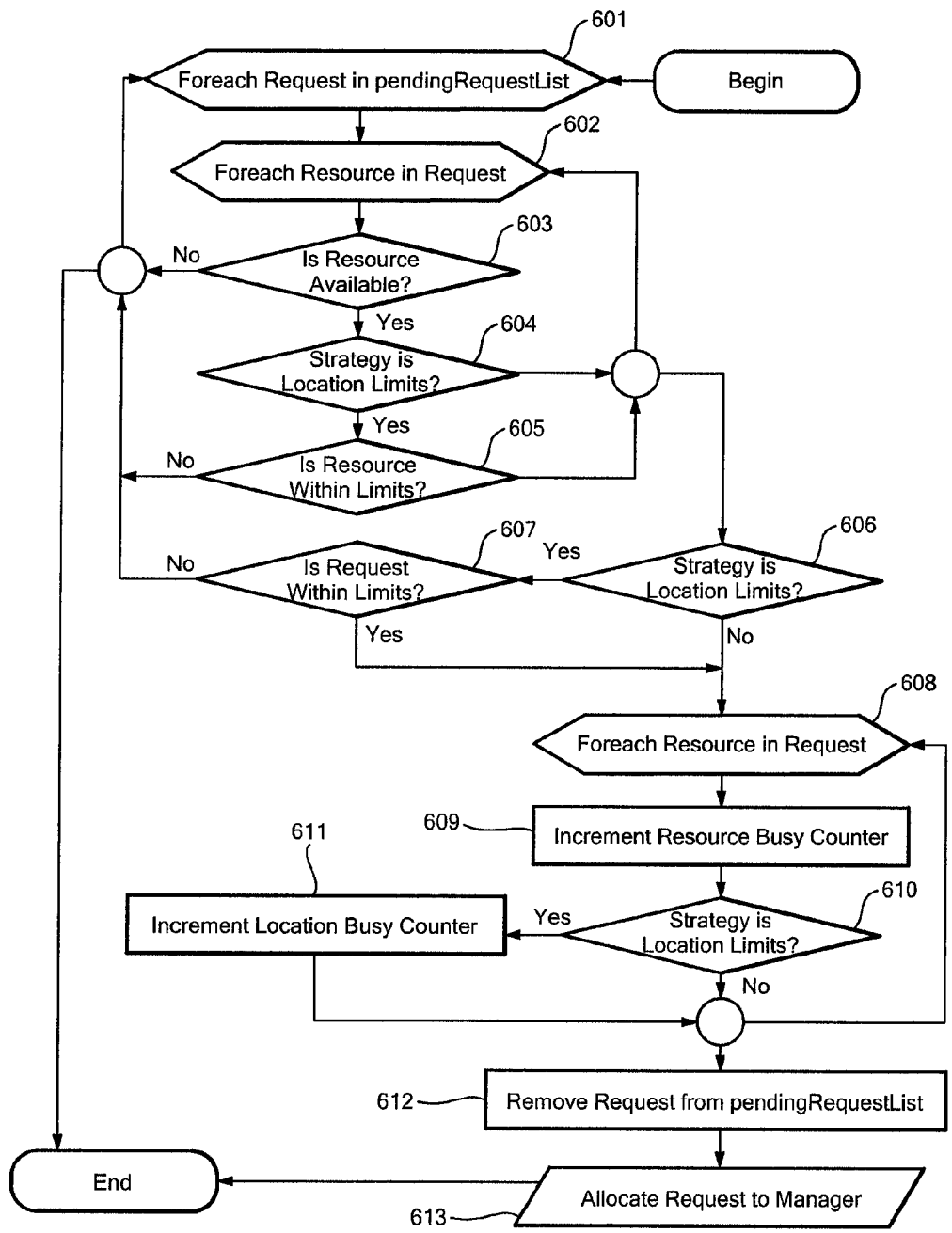
FIG. 6 is a flow diagram which illustrates an exemplary procedure for an allocation strategy to invoke a next request.

Referring now to FIG. 6, processing begins in processing block 601 in which the strategy iterates over the list of pending requests, in sorted order as arranged by the most recent invocation of the earlier step 503. For each such request, all the resources mentioned in the request are iterated over by the inner loop as shown in processing block 602. In decision block 603, resource schedules and busy counters are compared to the number of resources desired by the present request to determine if this resource's portion of this request can be satisfied.

For example, suppose the request would like to allocate five (5) carpenters. Suppose furthermore that resource capacity schedule indicates that there are six (6) carpenters available at the current simulated time. Then, if no carpenters are currently allocated to other requests, there are sufficiently many available that execution proceeds from decision block 603 by the affirmative branch (i.e. processing flows to decision block 604).

If, on the other hand, the current value of the busy counter for carpenters indicates that two (2) carpenters have already been allocated to earlier requests (and not yet freed again), then six (6) less the two (2) busy is four (4), which does not allow the requested five (5) carpenters to be allocated, and hence decision block 603 proceeds by the negative branch.

If sufficient resources are not found to be available at decision block 603, then the outer loop iterates and the next pending request, if any, is examined. If sufficient resources are found to be available at decision block 603, then processing proceeds to decision block 604. If the strategy is the basic priority strategy (i.e. the strategy is not the location limits strategy) then the negative branch is followed from decision block 604 and processing block iterates over any additional resources in the present request.

If in decision block 604 a decision is made that the strategy is the location limit strategy, then the affirmative branch is followed at decision block 604, and then, as shown in decision block 605, consideration is given as to whether any location limits declared by the user prevent the requested amount of resource from being allocated.

Suppose, for instance, that the request indicates that one (1) plumber is requested for work to be performed in location room A. It has already been determined that a sufficient number of plumbers are available at the current simulated time, given the current plumber busy count, to allocate the requested additional plumber. By examining the location limits and location busy counters, however, it is determined that a limit of two (2) plumbers in room A has been declared, and the location busy counter for plumbers in room A indicates that two (2) plumbers have already been granted to requests in room A, and therefore an additional plumber allocation would exceed the limit.

In this case, decision block 605 proceeds on the negative branch, returning to the outer request loop at processing block 601. If no such limit violations would be incurred, however, decision block 605 branches affirmatively, and the inner resource loop is continued at processing block 602.

If no pending requests are found in the outer loop implemented by block 601 that are satisfiable at the present simulated time, then the loop terminates and returns a negative indication to the manager, which then proceeds on the negative branch from decision block 311 of FIG. 3.

If, however, the end of the inner loop implemented by processing block 602 is ever reached, this indicates that the request being examined in that iteration of the outer loop is one that can indeed be satisfied at the present simulated time. Flow of control therefore proceeds to decision block 606, where, if the strategy is a location limit strategy, decision block 607 makes a final determination whether the entire request can be honored without violating any declared location limits. This possibility arises because, in the exemplary embodiment described herein, the location limit strategy allows the user to declare limits both on resource, location pairs, and on locations singly. The meaning of a limit declared on a location alone is that the limit cannot be exceeded by any combination of resource types working in that location.

For example, and referring briefly to FIG. 8, consider the limits declared in block 821 of FIG. 8. At block 822, a limit of two (2) plumbers in room A is declared. But in block 823 a limit of three (3) of any kind of resource is declared in room A. Therefore, although no carpenter limit is declared in room A, the location limit strategy using this configuration of declared limits will not be able to allocate two (2) additional carpenters to a room A request, if two plumbers are already busy there.

Returning now to FIG. 6, if decision block 607 determines that the entire request would exceed a location limit, then processing proceeds to processing block 601 and the outer loop iterates again. If, on the contrary, the location limit strategy is not in effect, or if it is but the request is satisfiable in the face of all declared location limits, then at processing block 608, all of the constituent resources of the request are iterated once again, from the beginning. At processing block 609, the busy counter for the resource is incremented by the amount of resource to be allocated.

If, at decision block 610, it is found that the location limit strategy is being used, then all applicable location busy counters are incremented at processing block 611. Otherwise if in decision block 610, it is found that the location limit strategy is not being used, the resource loop is iterated at processing block 608. When all resources in the request have been handled in this way, the loop exits to processing block 612, where, having been fully allocated, the request is removed from the list of pending requests. At processing block 613, the allocated request is returned to the manager. Having received the allocated request, the manager proceeds on the affirmative branch from decision block 311 of FIG. 3.

The implementation of the allocate next request operation is important to the semantics of the allocation strategy. There are obvious extensions to the preferred embodiment which could provide additional functionality or different allocation semantics. Consider, for instance, that the request priority might be irrelevant to some class of allocation strategies. An alternative embodiment might, therefore, sort the pending request list in some other order, such as in reverse order of the amount of work to be performed by the request. Or, an alternative embodiment might randomize the pending request list rather than sort it. Or, the pending list might be serviced in first-in-first-out (FIFO) order. Or, requests in the pending list might be re-ranked (or re-ordered) dynamically by the manager during the course of a simulation is order to satisfy a particular allocation strategy. Or, a particular allocation strategy might employ multiple strategies for different requests or at different points in time during a simulation. This is referred to as a composite allocation strategy. Such techniques might be used to help achieve better parallelism of allocated resources, or to reduce parallelism, as the goals of the simulation required.

In the exemplary embodiment described herein, there is also no way for the requester to describe a disjunctive allocation. That is, the requestor cannot express a request for either two (2) carpenters or, failing that, three (3) plumbers, but not both carpenters and plumbers. After reading the description provided herein, however, it should now be clear to one of ordinary skill in the art, that modifications to the contents of the request parameters and concomitant modification to the allocate next request logic could accommodate such disjunctive allocation requests.

Another type of extension would be means for expressing minimum and maximum requested allocations. In some simulations, particularly when a large task is to be undertaken, it may be beneficial to express in the allocation request a need for at least three (3) carpenters, but as many as six (6) could be used if they are available for allocation. The allocation strategy would then implement Allocate Next Request is such a way as to allocate requests that can be honored at levels as high as the maximum requested but at levels not less than their minimum requested levels.

Figure 7:
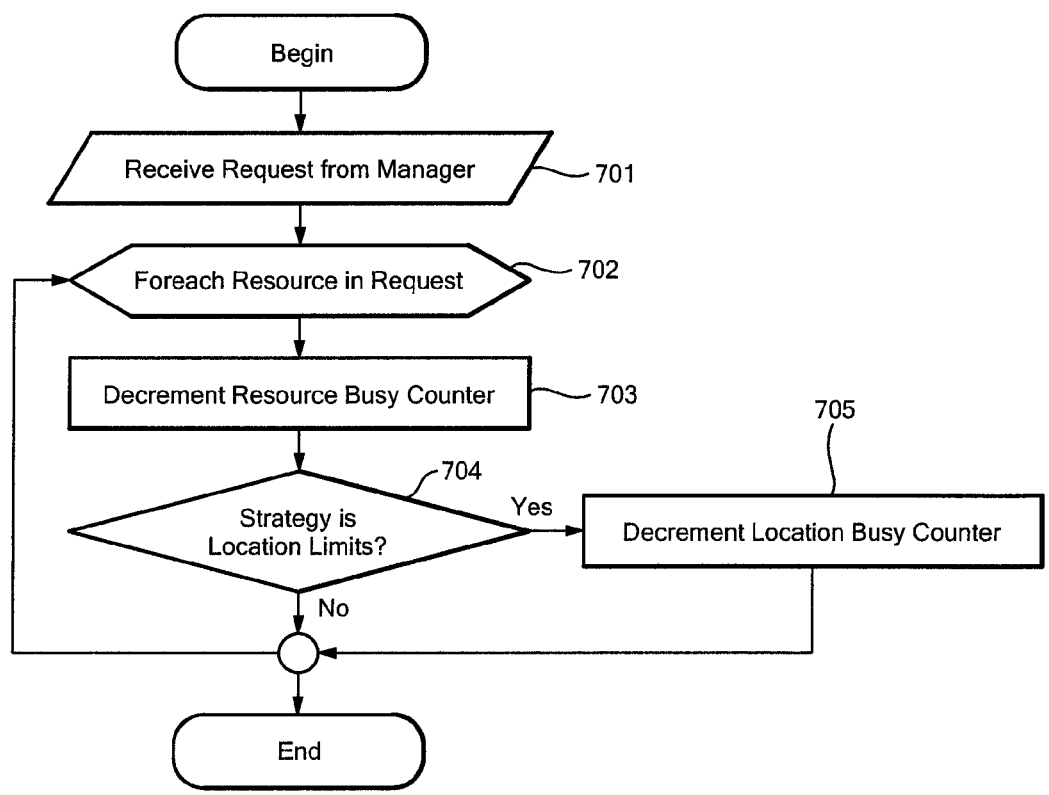
FIG. 7 is a flow diagram which illustrates an exemplary procedure for processing a free request provided to an allocation strategy.

At processing block 309 of FIG. 3, the manager passes along a request from the requestor to be freed to the strategy, which operation is depicted next in FIG. 7.

Referring now to FIG. 7, At processing block 701, the strategy receives the request to be freed, and at processing block 702 implements an iteration over the constituent resources of the request. For each such resource, processing block 703 decrements the respective resource busy counter. The location limit strategy branches at decision block 704 to processing block 705 where all relevant location busy counters are similarly decremented. The iteration terminates when all the resources allocated in the request have been accounted for in allocation strategy data Referring now to FIG. 8, a plurality of exemplary data structures 801, 811 and 821 maintained by the allocation strategy are shown. In particular, data structure 801 corresponds to a data structure used for resource schedules and busy counters while data structure 811 corresponds to a data structure used for a pending request list. The values stored in the resource schedules and busy counters data structures 801 and the list of pending requests stored in data structure 811 may be used by any basic priority strategy, including a location limit strategy. Only a location limit strategy, however, makes use of the data stored in the location limits and busy counters data structure 821.

The resource schedules and busy counters data structure includes a first column 801a under which resources are listed, a second column 801b under which schedule data is listed and a third column 801c under which busy count values are listed. In the example of FIG. 8, under column 801a, two resources are listed (i.e. plumbers and carpenters). It should be appreciated that although only two resources are listed in this example, those of ordinary skill in the art will appreciate that a plurality of resources could be included in data structure 801 and that each resource could include it's own associated schedule and busy count.

Table 802a describes a schedule whereby five plumbers (5) are available to be allocated to work beginning on day one (1) of the simulation while table 802b describes a schedule whereby three (3) carpenters are available to be allocated to work beginning on day one (1) of the simulation, and then more carpenters become available on day three (3), making a total of six (6) carpenters available thereafter. At 803, the count of carpenter resources currently allocated to one or more requests, and hence considered busy, is seen to be two (2). At block 811, the pending request list contains three requests.

The location limits and busy counters data structure 821 includes a first column 821a under which locations are listed, a second column 821b under which limits for a single resource type (here, plumbers) are listed, and a third column 821c under which limits are listed regardless of resource type. In the example of FIG. 8, two locations (i.e. Room A, Room B) are listed under location column 821a. It should be appreciated that although two locations are shown in this example, in some cases only one location is listed while in other cases a plurality of locations can be listed under column 821a. The particular number of locations, resources and limits to list in any particular case can be selected in accordance with a variety of factors including but not limited to the particular job being considered. For example, in a construction project to build a structure having one-hundred (100) rooms, all one-hundred (100) some or all of the one-hundred (100) rooms may be listed in data structure 821 and each location (i.e. each of the one-hundred (100) rooms) could have associated with it one or more resources with limits placed on the resources (e.g. no more than 2 plumber in Room A at the same time).

It should be appreciated that it is possible for locations and resource types to overlap and that this can result in multiple limits be applicable to a given resource allocation request. For example, a location may be identified as "first floor." This "first floor" location may have certain limits associated with it (e.g. no more than three (3) people may work on the first floor at the same time). If room A is located on the first floor, then both the first floor limits as well as the room A limits (e.g. limit three (3) 825 in the example of FIG. 8) apply to a request for resources in room A. Thus, it should now be appreciated that it is possible for any number of limits (including but not limited to no limits) to apply to a resource allocation request.

Table 822 includes a Limit column 822a and a Busy Count column 822b. The Limit column 822 has a value stored therein which limits to two (2) the number of plumbers who may work in Room A at the same time. The Busy Count column 822b has stored therein a count of two (2) which indicates that simulated plumber activity in Room A is currently at that limit. Similarly, as shown in Table 824 Limit column 824a has a value stored therein which limits to three (3) the number of plumbers who may work in Room B at the same time (i.e. Limit column 824a describes a limit of three (3) plumbers for any activity in Room B). Busy Count 824b holds the value zero (0) which indicates that no plumbers are presently engaged in Room B.

Table 823 in column 821c holds a value which indicates that a limit of three (3) of any type of resource is declared in room A, and 2 resources are presently active in room A. Notice that the two busy resources mentioned in block 823 must, by inference, be plumbers, since the busy count in block 822 indicates that there are two (2) plumbers busy. If another resource was to be immediately subsequently allocated to work in room A, it could not be another plumber, or the two (2) plumber room A limit would be exceeded.

Referring now to FIG. 9, an exemplary request structure 901 includes a collection of parameter, value pairs in the preferred embodiment. As shown in FIG. 9, exemplary parameters correspond to resources, priority, QueueID and Location parameter. Each of the parameters has a corresponding value. Table 902 has stored therein the value of the Resources parameter, indicating how many of each type of resource are required to fulfill this particular request. In this example, values 902a, 902b indicate that the resources being requested are carpenters and plumbers while values 902c, 902d indicate that two (2) plumbers and one (1) carpenter are requested. The zero Allocated values 902e, 902f indicate that the request has not been allocated yet, or, equivalently, it has been allocated and freed already.

Block 903 indicates that this particular request (i.e. request 901) has priority ten (10), allowing the request to be compared to other pending requests with respect to priority.

The QueueID value of Queue X in block 904 identifies the allocation queue in which the requestor can be found waiting when, having been allocated by the strategy, this request is returned to the manager at step 312 of FIG. 3, and the manager releases the requestor from the queue at step 206 of FIG. 2.

In block 905, room A is identified as the location at which the request work unit is to be performed once the resources described in the request have been allocated.

It should be appreciated that request data is first constructed when a requestor creates a new request as shown in step 202 of FIG. 2. Since the contents of the request must be coordinated with the allocation strategy, the preferred embodiment includes this operation (a so-called "factory method," in object oriented terms) in the specification of the allocation strategy interface, which is implemented by both the basic priority strategy and the location limit strategy. Other embodiments might use other mechanisms, however, to ensure that the actual implementation of the allocation strategy has a suitable request data structure with which to issue resource allocations, and to define how the strategy behaves if appropriate request data is not present.

Consider that the Location Limit Strategy must know the location where the pending request intends to perform its simulated work unit, in order to properly enforce location limits. In the preferred embodiment, the initially constructed request identifies no location, and it is therefore incumbent upon the requestor to assign a location in step 103 of FIG. 1. If, when the Location Limit Strategy receives a request at step 401 of FIG. 4, the request is found to identify no location, then it is considered an error condition and the simulation is terminated.

Figure 10:
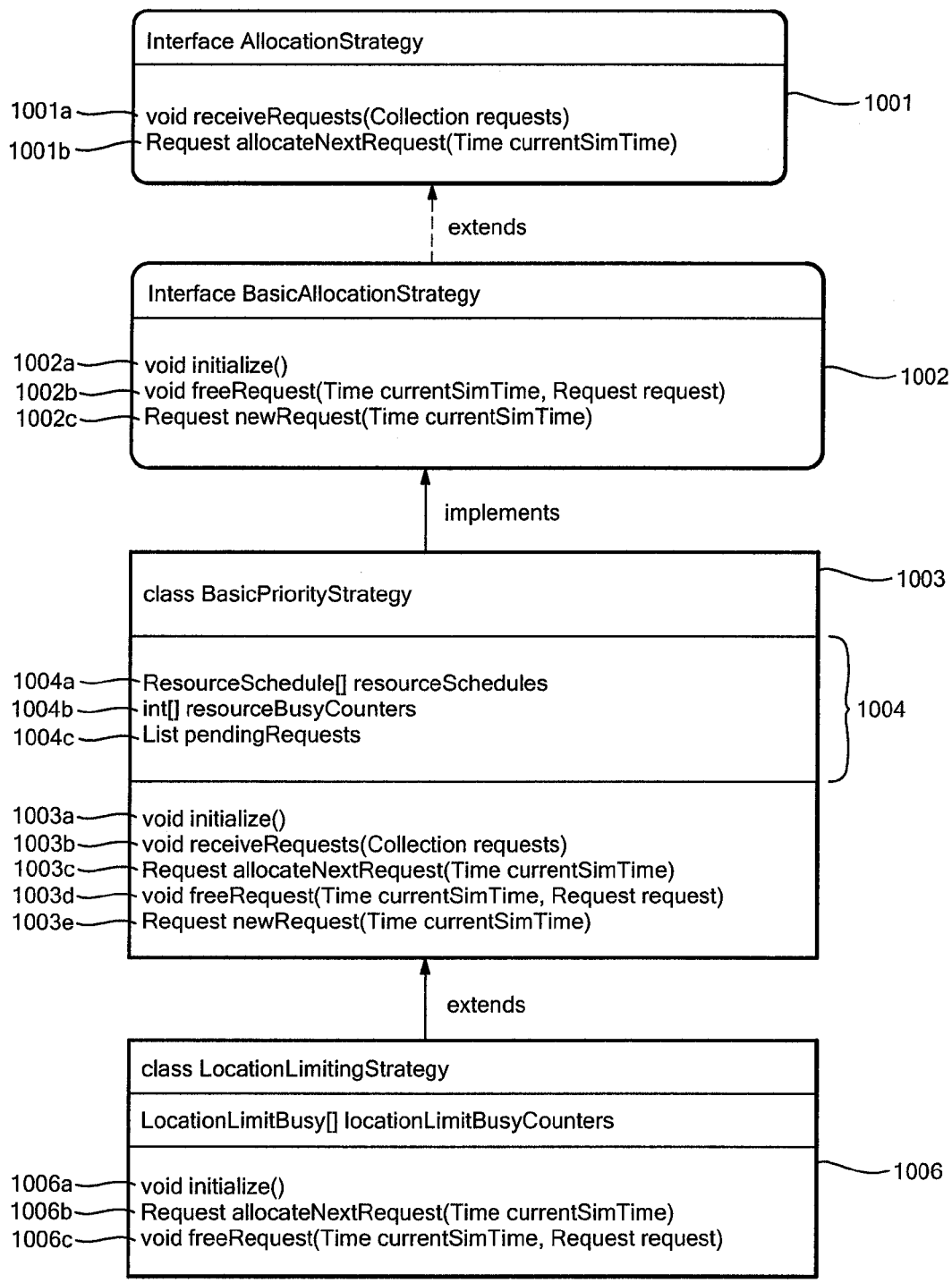
FIG. 10 is a class diagram of an allocation strategy interface which may similar to the allocation strategy interface described above in conjunction with FIG. 1.

Referring now to FIG. 10. an exemplary interface 1001 illustrating a fundamental form of the interface described above includes two declared operations 1001a, 1001b. Operation 100a is an operation to receive new requests and operation 1001b is an operation to allocate a next request 1001b.

Interface 1002 extends interface 1001 to add additional operations as implemented in an exemplary embodiment. In this exemplary embodiment, the additional operations are initialization 1002a, the freeing of an allocated request 1002b, and a factory method to create a new request object 1002c of a type appropriate for the currently instantiated allocation strategy object. A basic priority strategy class 1003 implements both of the aforementioned interfaces 1001, 1002. In addition to implementing the interface methods 1003a, 1003b, 1003c, 1003d, the basic priority strategy class 1003 includes instance variables 1004 corresponding to resource schedules 1004a, busy counters 1004b and a list of pending requests 1004c each of which, respectively hold the resource schedules, and busy counters and the list of pending requests. Specific values of these variables are depicted in blocks 801 and 811 of FIG. 8.

Finally, a location limit strategy class 1006 which extends the basic priority strategy class 1003 includes an initialize method 1006a, a method to allocate a next request 1006b and a method for freeing an allocated request 1006c. It should be appreciated that the methods of the basic priority strategy class 1003 which are overridden by the location limit strategy class 1006 are shown in FIG. 10. Also shown is an instance variable corresponding to a location limit busy counter 1006d which holds the values of the limits and busy counters associated with locations. One specific value of this variable is depicted in block 821 of FIG. 8.

Figure 11:
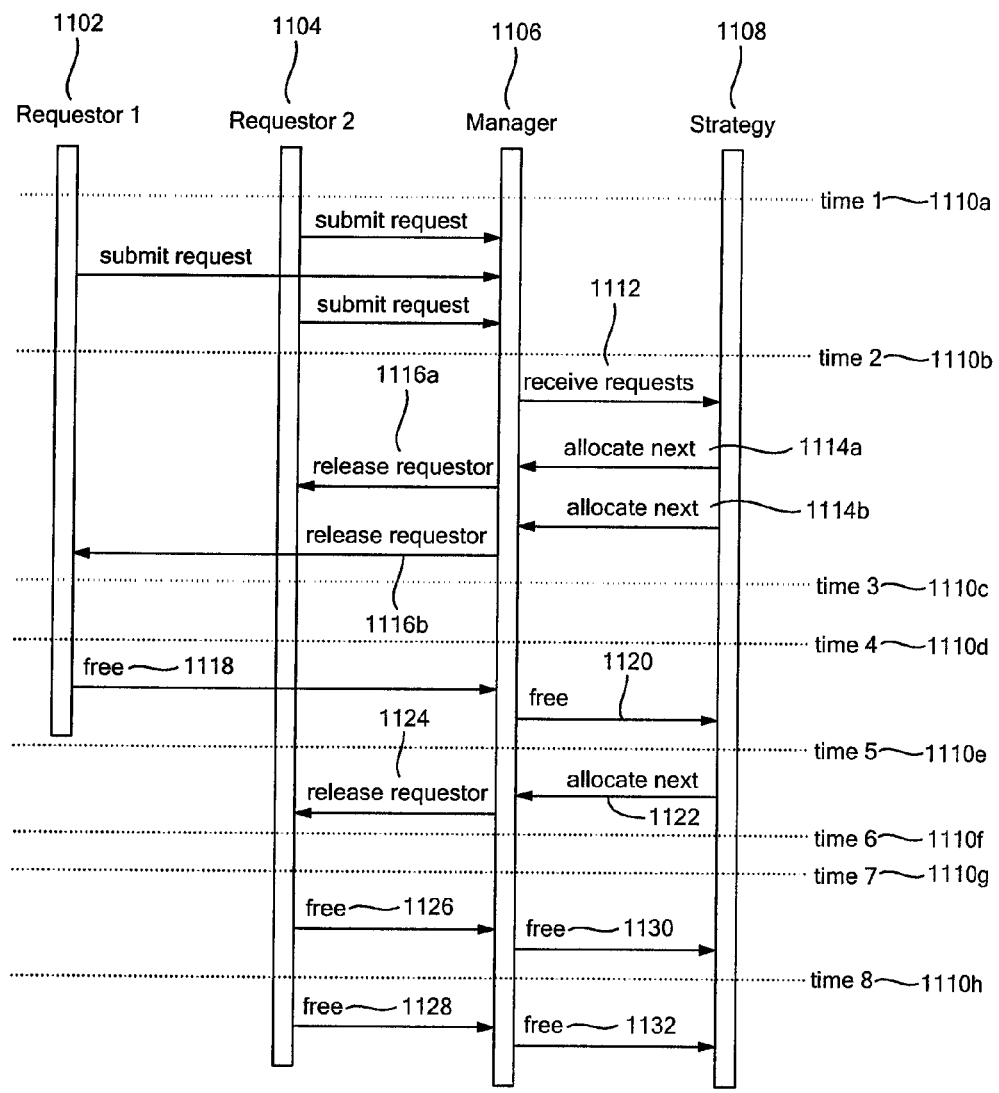
FIG. 11 is an interaction diagram which illustrates one possible sequence of interactions between two requestors, a manager and one or more the allocation strategy threads of execution.

Referring now to FIG. 11 an interaction diagram illustrates one possible sequence of interactions between two requestors 1102, 1004, a manager 1106, and allocation strategy threads of execution 1108 over a sequence of simulated times 1110a-1110h.

During simulated time 1 1110a, first Requestor 2, 1104 then Requestor 1 1102, then Requestor 2 1104 again, each submits a new request to the manager 1106.

If the manager 1106 has been scheduled for an allocate requests operation at the next simulated time, at time 2 1110b, the manager 1106 detects the advance of simulated time and hence passes the new requests to the allocation strategy 1108 as indicated by reference numeral 1112. The manager 1106 then iterates over calls to the strategy to allocate a next request. In the example shown in FIG. 11, the strategy returns two such requests 1114a, 1114b, one originating from each of the requestors 1102, 1104. The manager 1106 releases each of the requestors as appropriate from the respective allocation queue as indicated by reference numerals 1116a, 1116b.

At simulated time 3 1110c, each requestor is busy simulating one task, namely the task associated with the request that has just been allocated during time 2 1110b.

At time 4 1110d, requestor 1 1102 completes the simulated task, and as indicated by reference numeral 1118 frees it to the manager 1106, which then passes the freed request on to the strategy 1108 as indicated by reference numeral 1120. Requestor 1 has no other submitted requests outstanding, and it is assumed to make no further requests. Therefore, the requestor 1 thread completes during simulated time 41110d.

At time 5 1110e, as indicated by reference numeral 1122 the manager has been scheduled to attempt another allocate requests operation, and now finds that the one remaining pending request is returned from the allocation strategy 1108. The manager 1106 releases the originating requestor 2 1104 as indicated by reference numeral 1124.

At simulated time 6 1110f, requestor 2 1104 is simulating both of the tasks associated with the two requests it submitted at earlier time 1.

Requestor 2 completes one of the simulated tasks at time 7, and the other at time 8, and frees each corresponding request to the manager at the appropriate time as indicated by reference numerals 1126, 1128. The manager 1106 forwards each of these freed requests to the strategy as indicated by reference numerals 1130, 1132. At time 8 1110h there are no more outstanding requests and no further requests are to be submitted, so the simulation terminates.

Having described preferred embodiments of the invention, it will now become apparent to one of ordinary skill in the art that other embodiments incorporating their concepts may also be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A simulation system comprising:
a simulation model processor configured to simulate a construction project, said simulation model processor having an interface and adapted to accept one or more simulation parameters and one or more work units; and
at least one construction project resource allocation strategy, coupled to said simulation model processor, each of the at least one construction project resource allocation strategies for handling a resource allocation request for the construction project, each of said at least one construction project resource allocation strategies comprising user-defined logic which implements a strategy of construction project resource allocation in response to the resource allocation request for the construction project wherein at least one of the resource allocation strategies corresponds to a location limiting allocation strategy.

2. A simulation system comprising:
   a simulation model processor configured to simulate a construction project, said simulation model processor having an interface and adapted to accept one or more simulation parameters and one or more work units; and
   at least one construction project resource allocation strategy, coupled to said simulation model processor, each of the at least one construction project resource allocation strategies for handling a resource allocation request for the construction project, each of said at least one construction project resource allocation strategies comprising user-defined logic which implements a strategy of construction project resource allocation in response to the resource allocation request for the construction project wherein at least one of the resource allocation strategies corresponds to a location limiting allocation strategy and wherein said simulation model processor is adapted to receive one or more user-selectable simulation parameters wherein at least one of the user-selectable simulation parameters identifies at least one of a plurality of possible allocation strategies to use for a specific simulation.

3. The system of claim 2 further comprising:
   a first data structure corresponding to a resource schedules and busy counters data structure;
   a second data structure corresponding to a pending request list data structure;
   a third data structure corresponding to a location limits and busy counters data structure and wherein each of one or more allocation strategies has a corresponding first, second and third data structure associated therewith and where the corresponding allocation strategies maintain the corresponding ones of the first, second and third data structures.

4. The system of claim 2 wherein further comprising a requestor which issues requests having a request structure which includes one or more parameter, value pairs.

5. The system of claim 3 wherein at least one of the parameter values pairs in the request structure corresponds to a location parameter.

6. The system of claim 5 wherein the request structure further comprises:
   a resources parameter, a priority parameter and a queue identification parameter; and
   a corresponding value place holder for each of the resources parameter, priority parameter and queue identification parameter.

7. The system of claim 2 further comprising a manager for maintaining a request queue and for implementing user-defined resource allocation logic to determine a manner in which to allocate resources.

8. The system of claim 7 further comprising an interface for matching user-defined resource allocation strategies to the simulation processor.

9. The system of claim 8 further comprising an allocation queue wherein in response to a request being allocated by the allocation strategy to the manager, the manager examines the request to find an identifier of the allocation queue at which the requestor that submitted the request is waiting, and releases the requestor from that queue.

10. A method for simulating a resource request, the method comprising:
    creating a new request via a requestor;
    assigning request parameters;
    submitting the request to a manager;
    scheduling an allocation call to the manager in response to the request being allocated, simulating work with allocated resources;
    advancing a simulation time; and
    freeing a request to the manager wherein in response to the requestor creating a new request, the method comprises constructing request data wherein the contents of the new request are coordinated with the allocation strategy and wherein coordinating the contents of the new request with the allocation strategy comprises including a desired operation in the specification of an allocation strategy interface, which is implemented by at least one allocation strategy.

11. A method for simulating a resource request, the method comprising:
    creating a new request via a requestor;
    assigning request parameters;
    submitting the request to a manager;
    scheduling an allocation call to the manager in response to the request being allocated, simulating work with allocated resources;
    advancing a simulation time;
    freeing a request to the manager; and
    wherein in response to the requestor creating a new request, the method comprises constructing request data wherein the contents of the new request are coordinated with the allocation strategy and coordinating the contents of the new request with the allocation strategy comprises including a desired operation in the specification of an allocation strategy interface which is implemented by at least one allocation strategy including both a basic priority allocation strategy and a location limit allocation strategy.

12. The simulation system of claim 1 wherein said simulation model processor is adapted to receive one or more user-selectable simulation parameters wherein at least one of the user-selectable simulation parameters identifies at least one of a plurality of possible allocation strategies to use for a specific simulation.

13. The system of claim 12 further comprising:
    a first data structure corresponding to a resource schedules and busy counters data structure;
    a second data structure corresponding to a pending request list data structure;
    a third data structure corresponding to a location limits and busy counters data structure and wherein each of one or more allocation strategies has a corresponding first, second and third data structure associated therewith and where the corresponding allocation strategies maintain the corresponding ones of the first, second and third data structures.

14. The system of claim 12 wherein further comprising a requestor which issues requests having a request structure which includes one or more parameter, value pairs.

15. The system of claim 14 wherein at least one of the parameter values pairs in the request structure corresponds to a location parameter.

16. The system of claim 15 wherein the request structure further comprises:
    a resources parameter, a priority parameter and a queue identification parameter; and
    a corresponding value place holder for each of the resources parameter, priority parameter and queue identification parameter.

17. The system of claim 12 further comprising a manager for maintaining a request queue and for implementing user-defined resource allocation logic to determine a manner in which to allocate resources.

18. The system of claim 17 further comprising an interface for matching user-defined resource allocation strategies to the simulation processor.

19. The system of claim 18 further comprising an allocation queue wherein in response to a request being allocated by the allocation strategy to the manager, the manager examines the request to find an identifier of the allocation queue at which the requestor that submitted the request is waiting, and releases the requestor from that queue.

20. The simulation system of claim 1 wherein the location limiting allocation strategy enforces one or more limits on the number of resources of any type that can be allocated to perform work in a specific location, and/or the number of resources of a specific type that can be allocated to perform work in a specific location.

21. A simulation system comprising:
a simulation model processor configured to simulate a construction project, said simulation model processor having an interface and adapted to accept one or more simulation parameters and one or more work units; and
at least one construction project resource allocation strategy, coupled to said simulation model processor, each of the at least one construction project resource allocation strategies for handling a resource allocation request for the construction project wherein at least one of the resource allocation strategies corresponds to a location limiting allocation strategy which enforces one or more limits on the number of resources of any type that can be allocated to perform work in a specific location, and/or the number of resources of a specific type that can be allocated to perform work in a specific location.

* * * * *

UNITED STATES PATENT AND TRADEMARK OFFICE
CERTIFICATE OF CORRECTION

| | | |
|---|---|---|
| PATENT NO. | : 7,752,017 B1 | |
| APPLICATION NO. | : 11/389489 | |
| DATED | : July 6, 2010 | |
| INVENTOR(S) | : Daniel L. Leary et al. | |

It is certified that error appears in the above-identified patent and that said Letters Patent is hereby corrected as shown below:

Col. 3, line 6, delete "pair of needed" and replace with --pair needed--

Col. 4, line 26, delete "may similar" and replace with --may be similar--

Col. 4, line 30, delete "more the" and replace with --more of the--

Col. 4, line 41, delete "of" and replace with --of a--

Col. 5, line 46, delete "than" and replace with --that--

Col. 5, line 60, delete "method referred" and replace with --method is referred--

Col. 7, line 38, delete "P,28p" and replace with --P28p--

Col. 8, line 2, delete "request to based" and replace with --request based--

Col. 13, line 49, delete "to"

Col. 14, line 53, delete "is" and replace with --in--

Col. 14, line 60, delete "required." and replace with --require.--

Col. 15, line 10, delete "is" and replace with --in--

Col. 15, line 37, delete "used" and replace with --use--

Col. 15, line 48, delete "it's" and replace with --its--

Col. 15, line 65, delete "under limits:" and replace with --under which limits--

Signed and Sealed this
Twenty-fifth Day of January, 2011

David J. Kappos
*Director of the United States Patent and Trademark Office*

CERTIFICATE OF CORRECTION (continued)
U.S. Pat. No. 7,752,017 B1

Col. 16, line 17, delete "be" and replace with --being--

Col. 16, line 28, delete "822" and replace with --822a--

Col. 17, line 33, delete "100a" and replace with --1001a--

Col. 19, line 39, delete "values" and replace with --value--

Col. 20, line 56, delete "values" and replace with --value--